United States Patent [19]

Nakajima et al.

[11] 4,191,866

[45] Mar. 4, 1980

[54] THREE-FUNCTION SWITCH FOR A MOTORCYCLE

[75] Inventors: Kunihiko Nakajima, Hamakita; Kyoshi Sato; Toshimitsu Iio, both of Hamamatsu; Atsushi Kanda, Iwata, all of Japan

[73] Assignee: Yamaha Hatsudoki Kabushiki Kaisha, Iwata, Japan

[21] Appl. No.: 813,843

[22] Filed: Jul. 8, 1977

[30] Foreign Application Priority Data

Jul. 14, 1976 [JP] Japan .................... 51/93571[U]

[51] Int. Cl.² ........................ H01H 9/00; B60Q 1/26
[52] U.S. Cl. .................................. 200/4; 200/61.85; 200/157; 340/74
[58] Field of Search ............ 200/4, 61.27, 61.54, 200/61.85, 157, 6 R, 6 A, 18, 61.87, 61.88; 340/74

[56] References Cited

U.S. PATENT DOCUMENTS

| | | | |
|---|---|---|---|
| 2,841,659 | 7/1958 | Eitel | 200/6 A |
| 3,283,088 | 11/1966 | Scow et al. | 200/157 X |
| 3,511,943 | 5/1970 | Kibler | 200/4 |
| 3,671,691 | 6/1972 | Suzuki et al. | 200/4 X |
| 3,723,687 | 3/1973 | Adkinson | 200/157 |
| 3,750,080 | 7/1973 | Rouvre et al. | 200/4 X |
| 3,805,003 | 4/1974 | Rennels | 200/4 X |
| 3,940,579 | 2/1976 | Bühl et al. | 200/4 |
| 4,085,301 | 4/1978 | Smith | 200/157 X |

*Primary Examiner*—James R. Scott
*Attorney, Agent, or Firm*—Donald D. Mon

[57] ABSTRACT

A three-function single-lever switch for a motorcycle which includes two mutually pivoted mounts and a slider on one of the mounts, whereby the slider is rotatable around two axes and slidable on a third, whereby selectively to make three possible circuit connections.

5 Claims, 5 Drawing Figures

THREE-FUNCTION SWITCH FOR A MOTORCYCLE

BACKGROUND OF THE INVENTION

1. Field of the Invention

This invention relates to a switch device for a motorcycle in which three switches can selectively be operated by a single operating lever, i.e., a three-function single-lever switch.

When driving a motorcycle it is necessary to hold the steering grip firmly at all times. The manipulation of a switch must not be affected by operating conditions of the motorcycle, such as driving on a rough road, or cause unintended multiple actuations in case of an emergency. Accordingly, switches for motorcycles must be simple, and be operable quickly and easily. Also, they must be designed so as not to affect the operator's grip on the handle while he is driving the motorcycle.

It is an object of this invention to provide a three-function single-lever switch which can be utilized for the control of three functions, for example a horn, turn signal lights, and headlight beam control.

2. Description of the Prior Art

Three-function single-lever switches are known, and have been extensively used with automobiles. It is known for the lever to be pivotable along two axes at right angles to each other for controlling two sets of functions, and for a button to be placed at the end of the lever where it is depressible to control another function, such as a horn. There is a serious problem with this type of switch because the hand of the driver can contact not only the button on the end of the lever, but also the lever itself so as accidentally to cause actuation on multiple axes. This is because the lever is customarily quite long and exposed, and it requires considerable stability of hand for the driver to control only the button pressing. This is tolerable in a well-sprung, shock absorber-equipped vehicle. However, with a motorcycle conditions are different, and the switch must be made proof against accidental, unintended, actuation of more than one axis. It is an object of this invention to provide such protection.

SUMMARY OF THE INVENTION

A three-function single-lever switch according to this invention comprises a base, a first mount mounted to the base by bearing means for rotation around a first axis of rotation, a second mount, a second bearing means having a second axis of rotation mounting the second mount to the first mount for rotation around the second axis, and a slider slidably mounted to the second mount. The second mount has a third axis along which the slider is slidable. First and second switch means is respectively operably interposed between the base and the first mount and between the first and the second mounts. Each of the switch means has a first and a second switching condition established by the angular position around the respective axes. Third switch means is operably interposed between the second mount and the slider, said third switch means having a first and a second switch condition established by the axial position relative to the second mount.

BRIEF DESCRIPTION OF THE DRAWINGS

The invention will be fully understood from the following detailed description and the accompanying drawings, in which.

DESCRIPTION OF THE PREFERRED EMBODIMENT

Figure 1:
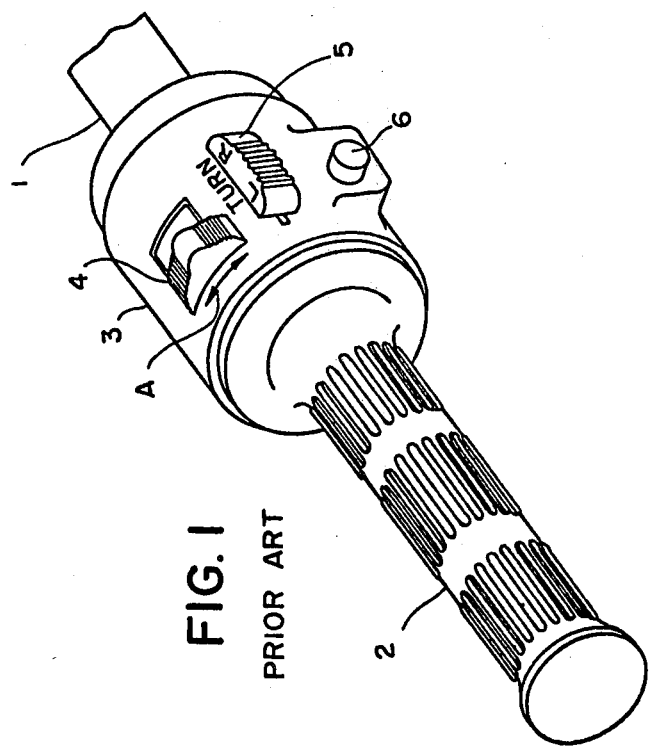
FIG. 1 is a perspective view of a prior art switching device.

FIG. 1 illustrates a prior art switch device for a motorcycle. It includes a cylindrical switch box 3 on the base portion of a left handle grip 2 in a steering handle 1. Box 3 forms part of the motorcycle handle. Operating levers for various switches are disposed on a peripheral surface of switch box 3. Reference numeral 4 designates a switch lever for switching headlight beams (high beam and low beam) of headlamps, the switch lever being slidably moved peripherally as indicated by arrow A to change the beams. A switch lever 5 is provided for controlling turn signal lamps, the switch lever being slidably moved laterally to provide a display of intended direction. A push button 6 is provided for actuating a horn switch.

In the aforementioned prior art device, the operating levers 4, 5 and 6 for the various switches are scattered on the peripheral surface of switch box 3 as described. For this reason, it is impossible to position all of the operating levers in their ideal position for motorcycle operations. For operation during running on rough surfaces, for example, and for quick reaction of the driver, it is much to be preferred for a single lever to provide for all three functions. Furthermore, inexperienced persons are less likely to be confused by a single lever.

The instant invention provides a switch device for a motorcycle in which three switches can selectively be operated by operating a single operating lever, whereby the operating lever may be disposed in an easily operatable position and without serious risk of unintended actuation.

Figure 2:
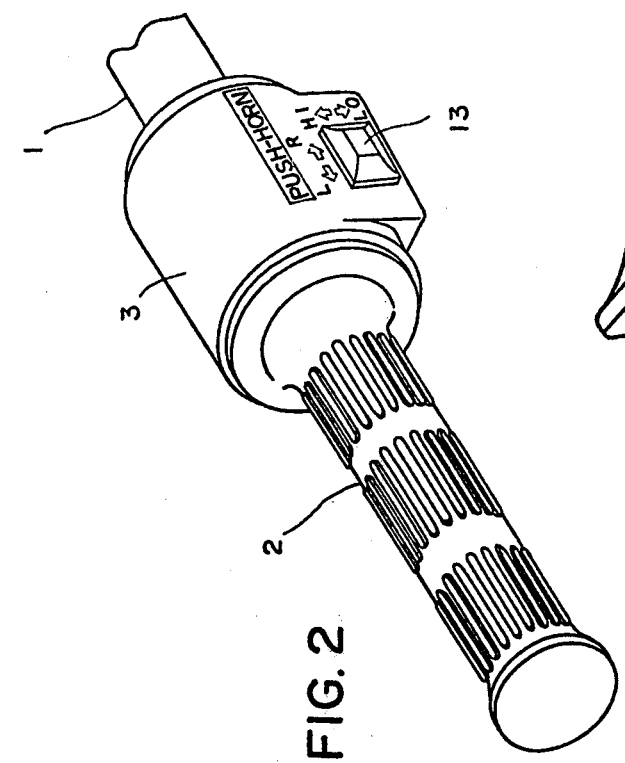
FIG. 2 is a perspective view of the presently-preferred embodiment of the invention.
Figure 3A:
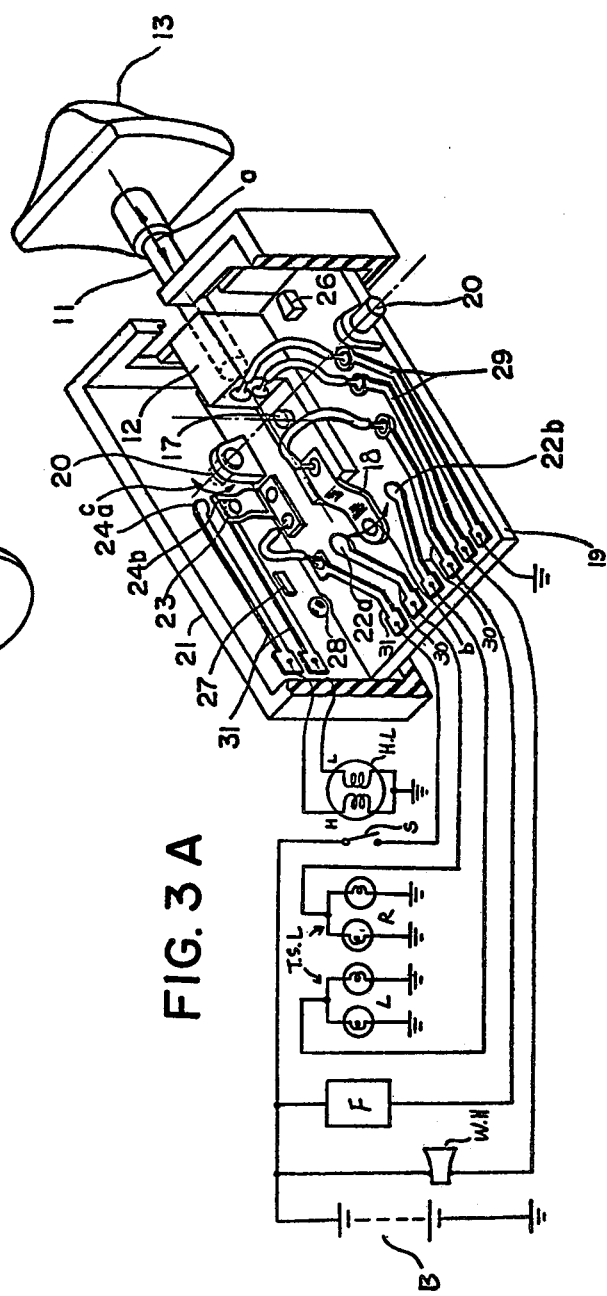
FIG. 3A is a perspective view, partly in cutaway cross-section, showing the device of FIG. 2 and its accompanying circuitry.
Figure 3B:
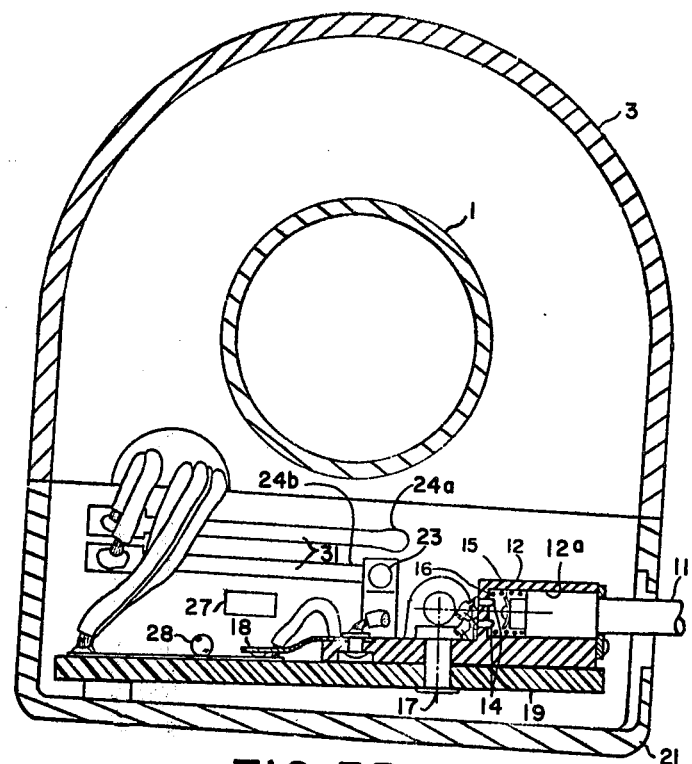
FIG. 3B is a cross-section taken in FIG. 2.

FIGS. 2, 3A and 3B show a three-function, single-lever switch according to the invention. A slider 11 is the portion which will be manipulated by the operator as operating means for three switches later to be described. Slider 11 is axially shiftably mounted to a second mount 12. An operating button 13 is fastened to the free end of the slider (sometimes called a "lever"). As best shown in FIG. 3B, slider 11 includes a contact 15 which is opposed to terminals 14. These terminals are mounted on mount 12 by insulation so that the slider 11 may be pressed against the spring bias of a compression coil spring 16 to provide, when pressed, an electrical connection between the contact 15 and the terminals 14 to achieve one switching condition of the "third switch". Said third switch comprises terminals 14 and contact 15. Its other switching condition is unactuated, and is caused by bias of the coil spring 16.

The second mount 12 includes a socket 12a within which the slider 11 is slidably mounted so as to be constrained to axial movement relative to the second mount 12.

The second mount 12 is mounted by second bearing means 17 to a first mount 19. Second bearing means 17 is in the form of a circular shaft having an axis of rotation extending vertically in FIG. 3A, around which the second mount 12 rotates. The second mount 12 carries a sliding contactor 18 which moves from side-to-side when the second mount 12 is rotated around bearing means 17.

A first bearing means 20 comprising a pivot pin pivotally mounts the first mount 19 to a base 21 (sometimes called "frame"). The frame 21 is preferably made of an electrical insulating material. The first bearing means 20 has an axis of rotation extending downwardly and to the right in FIG. 3A, and the first and second axes of rotation are at right angles to each other viewed from above. Accordingly, the first mount 19 is rotatably mounted to the base 21, and the second mount 12 is rotatably mounted to the first mount 19, and the slider 11 is slidably mounted to the second mount 12. Accordingly, the button 13 can be moved up and down and from side-to-side and pressed inwardly. The three axes preferably intersect at a point as shown.

In order to accomplish the desired switching functions, the first mount 19 carries fixed contacts 22a, 22b, which are spaced apart from each other, one on each side of the sliding contactor 18, where they will be contacted by rotation of the second mount 12 in one direction or the other. This direction is shown by arrow "b".

A slidable contact 23 is mounted to the first mount 19 and selectively comes into contact with fixed contacts 24a and 24b which are mounted to the sidewall of base 21.

Stop 26 limits the range of rotation of second mount 12. Stop 27 limits the range of rotation of first mount 19. A ball 28 constitutes a click mechanism for partically locking the first mount 19 after rotation thereof.

Print wirings 29, 30 and 31 lead the contacts and terminals to external connections.

The switch device as thus constructed is encased within switch box 3 ("cover means") that is positioned on the base portion of the handle grip 2 as shown in FIG. 2 with only the operating button and a portion of the slider exposed at the front on the side of the driver. Box 3 forms part of the motorcycle handle. Preferably, the button laterally overhangs the slider so as to prevent direct contact from being made with the slider itself. The slider passes through an opening in the wall of the switch box, and the switch box thereby protects, shrouds and conceals both of the mounts from contact by the hand or finger of the user.

With this arrangement, when operating button 13 is pressed in the direction "a", a circuit through the terminals 14 is closed. When it is moved toward the right or the left, second mount 12 can be rotated in the direction of arrow "b". When the slidable contact 18 is brought into contact with fixed contacts 22a or 22b, a switch circuit comprised of wiring 30 will be closed. When the operating button 13 is pushed up or down, the first mount 19 will be rotated around bearing means 20 in the direction shown by arrow "c" so that the slidable contact 23 comes into contact with one or the other of fixed contacts 24a or 24b selectively to close a switch circuit comprising the wiring 31. Accordingly, if the terminals 14 and the contact 15 are connected to a horn circuit, the print wiring 30 connected to a turn signal lamp circuit, and the print wiring 31 connected to a headlamp beam change circuit, a single switch device may possess the three functions consisting of the horn switch, the switch for turn signal lamps, and the beam changeover switch.

The present invention is not limited to the construction of FIGS. 3, but may also be designed such that the mounts are rotatable around differently oriented axes. For example, second mount 12 may be rotated longitudinally while the first mount 19 is rotated laterally. Such an arrangement is shown in FIG. 4, which illustrates another embodiment of the invention, but this structure is merely schematically illustrated therein with elements such as contacts, terminals, wirings, and click mechanisms being omitted.

Figure 4:
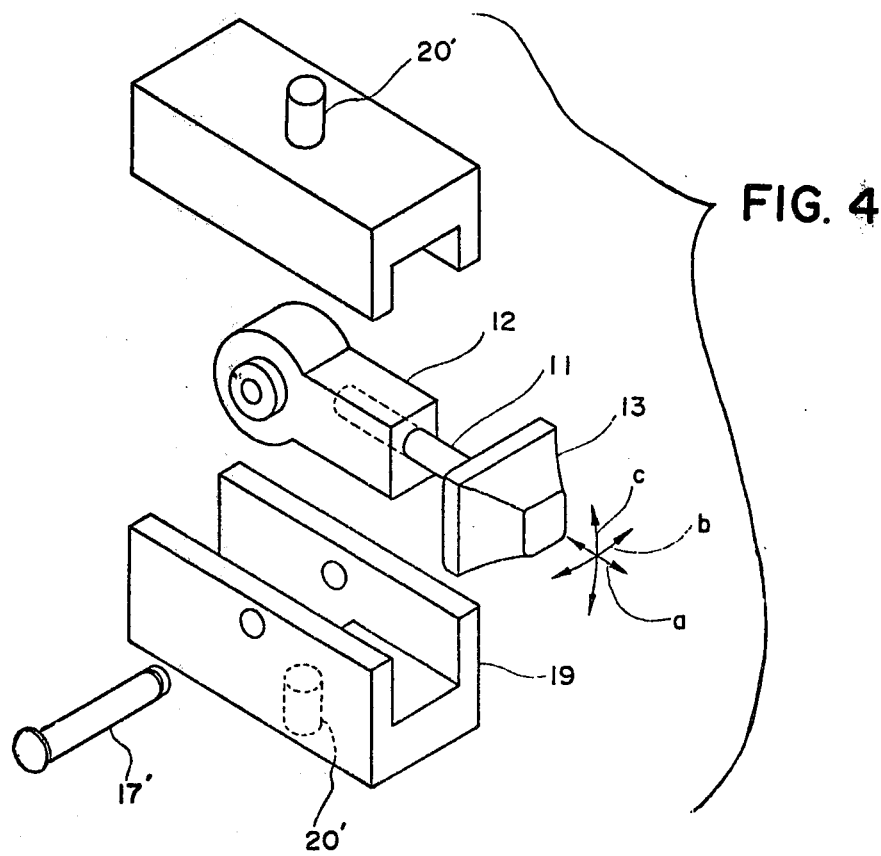
FIG. 4 is an exploded view of another embodiment of the invention.

FIG. 4, numeral 11 designates a slider and numeral 13 designates an operating button which are substantially like those shown in FIG. 3A. Numeral 17' designates a second bearing means and numeral 20' designates a first bearing means for rotatably supporting first mount 19 on the frame, but around a vertical instead of a horizontal axis.

In accordance with the present invention, because three individual switches may be operated by a single operating lever, an operating button can be installed in an easily accessible and manipulable position. Since one operating button will suffice, quick switch operation can be accomplished selectively and securely. In addition, safe driving may be assured, even for an inexperienced driver, without any effect on his holding the handle grip during the operation. Moreover, where the slider and the axis of the slider and the two rotary axes intersect at right angles to each other, there results a construction in which their respective operations do not interfere with one another, and malfunction is averted.

Especially it is to be emphasized that, in contrast with prior art devices wherein the second mount is accessible to the hand, it is not possible to oppose the operation of the button by force on either of the mounts by the hand of the user. This is the purpose of enclosing the mounts in the case or inside the handle, and safety and selectivity are greatly improved over what is known in the prior art.

This invention is not to be limited by the embodiments shown in the drawings and described in the description, which are given by way of example and not of limitation, but only in accordance with the scope of the appended claims.

We claim:

1. A three-function single-lever switch for a motorcycle comprising: a base; a first mount; a first bearing means having a first axis of rotation mounting said first mount to said base for rotation around said first axis; a second mount; a second bearing means having a second axis of rotation mounting said second mount to said first mount for rotation around said second axis; a slider slidably mounted to said second mount, said slider having a free end distant from said second mount, said second mount having a third axis along which said slider is slidable, said first and second axes intersecting and being normal to one another; first and second switch means respectively operably interposed between the base and the first mount and between the first and the second mounts, each of said switch means having a first and a second switching condition established by their angular position around their respective axis, and the third switch means operably interposed between the second mount and the slider, said third switch means having a first and a second switching condition established by the axial position of the slider relative to the second mount, the movement of the first mount relative to the base being limited to rotation around the second axis, and movement of the slider relative to the second mount being limited to axial movement along said third axis, cover means enclosing said mounts and having an opening through which said free end of the slider projects, whereby simultaneous manual contact of the free end and of the first or second mount is not possible, nor is there a sufficient length of slider projecting from the cover means that the operator can contact its side while depressing the slider.

2. A three-function single-lever switch according to claim 1 in which said cover means is part of the handle of a motorcycle.

3. A three-function single-lever switch according to claim 1 in which said second mount carries a socket, said slider making a sliding fit in said socket.

4. A three-function single-lever switch according to claim 1 in which one of the switches is connected to circuitry for changing the beams of headlamps, another is connected to circuitry for directional signal lamps, and said third switch means is connected to circuitry including a horn.

5. A three-function single-lever switch according to claim 4 in which said cover means is part of the handle of a motorcycle.

* * * * *